United States Patent [19]
Gehrmann

[11] Patent Number: 5,301,016
[45] Date of Patent: Apr. 5, 1994

[54] METHOD OF AND ARRANGEMENT FOR DERIVING A CONTROL SIGNAL FOR INSERTING A BACKGROUND SIGNAL INTO PARTS OF A FOREGROUND SIGNAL

[75] Inventor: Rainer Gehrmann, Alsbach-Hähnlein, Fed. Rep. of Germany

[73] Assignee: U.S. Philips Corporation, New York, N.Y.

[21] Appl. No.: 987,894

[22] Filed: Dec. 4, 1992

[30] Foreign Application Priority Data

Dec. 21, 1991 [DE] Fed. Rep. of Germany ....... 4142650

[51] Int. Cl.$^5$ ............................................. H04N 9/75
[52] U.S. Cl. ............................................. 348/586; 348/578
[58] Field of Search ................... 358/22, 22 C, 22 AP, 358/22 CK, 182, 183, 169, 181, 36, 37; H04N 9/74, 9/75, 9/76

[56] References Cited

U.S. PATENT DOCUMENTS

| | | | |
|---|---|---|---|
| 3,989,888 | 11/1976 | Busch et al. ......................... | 358/182 |
| 4,356,511 | 10/1982 | Tsujimura ......................... | 358/181 |
| 4,394,680 | 6/1983 | Watanabe ......................... | 358/22 |
| 4,488,169 | 12/1984 | Yamamoto ......................... | 358/22 |
| 4,533,937 | 8/1985 | Yamamoto et al. ................. | 358/22 |
| 4,789,893 | 12/1988 | Weston ......................... | 358/136 |
| 5,022,085 | 6/1991 | Cok ......................... | 382/1 |
| 5,046,165 | 9/1991 | Pearman et al. ................. | 358/183 |
| 5,194,952 | 3/1993 | Pellen ......................... | 358/183 |

Primary Examiner—Victor R. Kostak
Assistant Examiner—Nathan J. Flynn
Attorney, Agent, or Firm—Edward W. Goodman

[57] ABSTRACT

In a method, in which a control signal assumes a first value when the foreground signal represents a color in the region of the key color and a second value when the foreground signal represents a different color, and in which the control signal has a transition range between the two values, the distances between the color locations of the pixels of the foreground signal and the color location of the key color are computed for distinguishing color locations associated with foreground objects or with the key color from color locations to be associated with the transition range. Those color locations whose distance is distinguished from color locations of one or a plurality of adjacent pixels by more than a predetermined distance (not complying with a homogeneity criterion) are considered to be associated with the transition range. Intermediate values of the control signal are computed for the color locations in the transition range.

4 Claims, 7 Drawing Sheets

METHOD OF AND ARRANGEMENT FOR DERIVING A CONTROL SIGNAL FOR INSERTING A BACKGROUND SIGNAL INTO PARTS OF A FOREGROUND SIGNAL

BACKGROUND OF THE INVENTION

1. Field of the Invention

The invention relates to a method of deriving a control signal for inserting a background signal into parts of a foreground signal, these parts being fixed by a key color, the control signal assuming a first value when the foreground signal represents a color in the region of the key color, and a second value when the foreground signal represents a different color, and in which the control signal has a transition range between the two values, and to an arrangement for carrying out that method.

2. Description of the Related Art

A method, which is often used in television for mixing different pictures of the corresponding signals is the chromakey method. In this method a foreground signal is used which partly comprises a predetermined color—generally blue—which is replaced by corresponding parts of a background signal. The foreground signal and a background signal are applied to a picture mixer which enables the two signals to be switched in dependence upon a control signal derived from the foreground signal.

In known arrangements of this type, the control signal is a switching signal, whereby a first value of this signal is associated with the key color and a second value of the signal is associated with those colors which deviate from this key color. Since the blue wall used for performing the method does not have a constant color, which is particularly due to non-uniform illumination, the aim is to extend the key color region to a possibly large region in the color plane, but in which the colors in the foreground should not be included. However, the sudden switching between the foreground and the background gives rise to errors, even at the smallest shift with respect to time of the switching instant. Unprogrammed switching to the blue wall is very disturbing at the edges of the foreground. Particularly in the case of fine details, color fringes occur, more specifically in the hairline of a person who is standing in front of a background.

In an improvement of the known method, which is also referred to as soft chromakey, a proportional zone is introduced between the key color region and the foreground colors, and the control signal is no longer limited to the range of "0" and "0". Then there is a soft fading between the foreground signal and the background signal. zone, simple mathematical derivations are used which result in corresponding geometric shapes, such as diamonds, circles or ellipses. As an example for an already proposed method of this type, reference is made to Application DE 40177878 (PHD 90-252). In this method light color fringes still occur, particularly when or where the proportional zone is not close to the colors representing the foreground.

SUMMARY OF THE INVENTION

It is an object of the present invention to derive a control signal for inserting a background signal into key color-determined parts of a foreground signal in such a way that the proportional zone is close to the colors representing the foreground, thus providing an important condition for avoiding blue fringes at the foreground edges.

For this purpose, the invention provides that in a method of and an ararrangement for deriving a control signal for inserting a background signal into parts of a foreground signal fixed by a key color, in which the control signal assumes a first value when the foreground signal represents a color in the region of the key color, and a second value when the foreground signal represents a different color, and in which the color signal has a transition range between the two values, that the distances between the color locations of the pixels of the foreground signal and the color location of the key color are computed for distinguishing color locations associated with foreground objects or with the key color from color locations to be associated with the transition range. Those color locations whose distance is distinguished from locations of one or a plurality of adjacent pixels by more than a predetermined distance (not complying with a homogeneity criterion) are considered to be associated with the transition range. Intermediate values of the control signal are computed for the color locations in the transition range.

The method according to the invention, where the distances between the color locations of the pixels of the foreground signal and the color locations of the key color are computed for distinguishing color locations associated with foreground objects or with the key color from color locations to be associated with the transition range, those color locations whose distance is distinguished from color locations of one or a plurality of adjacent pixels by more than a predetermined distance (not complying with a homogeneity criterion) are considered to be associated with the transition range, and intermediate values of the control signal are computer for the color locations in the transition range, has the advantage that an important condition for avoiding color fringes is provided. The key region generated by means of the method according to the invention, including the proportional zone, is substantially adapted to the region of the foreground colors.

BRIEF DESCRIPTION OF THE DRAWINGS

These and other aspects of the invention will become apparent from and elucidated with reference to the embodiments described hereinafter. In the drawings.

DESCRIPTION OF THE PREFERRED EMBODIMENT

Identical components in the Figures have the same references.

The method according to the invention may be performed with separate spacial circuits suitable for the computing operations. All computing operations may alternatively be performed by means of an application specific integrated circuit (ASIC). The method may also be performed with a suitably programmed and sufficiently rapid signal processor. The block diagram of FIG. 1 therefore illustrates the method according to the invention and represents an embodiment of an arrangement for performing the method according to the invention.

Figure 1:
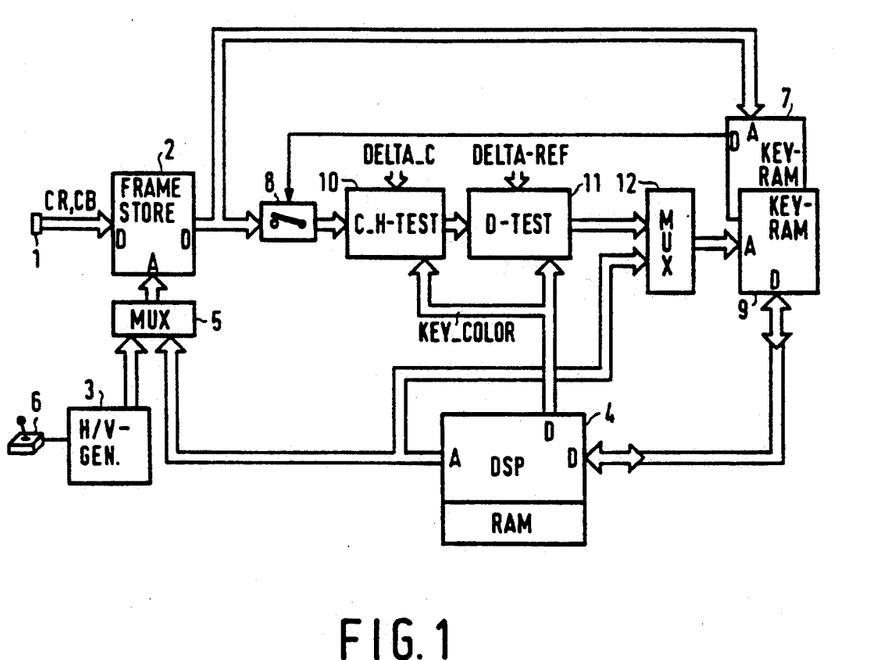
FIG. 1 is a block diagram of an arrangement for performing the method according to the invention.

Chrominance signals Cr and Cb are applied to the arrangement via an input 1. The chrominance signals are present in a digital form as 8-bit wide data words. A memory 2 is used for buffering the chrominance signals for each picture. The memory 2 is addressed optionally by a horizontal and vertical synchronizing signal (H/V) generator 3 and a digital signal processor 4 whose output data can be applied to the address input of the memory 2 via a multiplexer 5. The H/V generator 3 is connected to a joystick 6 for fixing a picture section or frame.

The data output of the memory 2 is connected to an address input of a further memory 7 and to a gate circuit 8 which is controlled by data derived from the further memory 7. The further memory 7 and a third memory 9 are used for buffering the function between the control signal and the chrominance signals, i.e. for buffering the key region including the proportional zone and will hereinafter be referred to as control signal memories. Two signal memories are provided in order that new data can be simultaneously written into the control signal memory 9, while the gate circuit 8 can be controlled by data read from the control signal memory 7.

The output signals of the gate circuit 8 are consecutively applied to the address input of the control signal memory 9 via two connectable test circuits 10, 11 and a multiplexer 12. However, instead of chrominance signals, addresses generated by the digital signal processor 4 can be applied via the multiplexer 12 to the address inputs of the control signal memory 9. Moreover, data transmission between the control signal memory 9 and the digital signal processor 4 is also possible.

Before a further explanation of the arrangement of FIG. 1 with reference to FIGS. 5 to 9, the problem on which the method according to the invention is based will be described with reference in FIGS. 2a-2d.

Figure 2A:
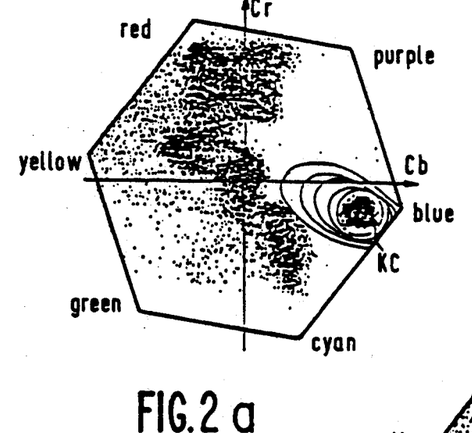
FIGS. 2a-2d show various color plane to explain the object of the invention.

FIG. 2a shows an example in the color plane in which the single color locations of the blue wall are situated relatively close together, whereas the color locations of the foreground are clearly distinguished from those of the blue wall. The elliptical proportional zone indicated in the example shown satisfactorily covers the cyan foreground objects, but the proportional zone commences too late for the red objects. Transition colors, which are not shown in the Figure, result in color fringes during transformation at a later stage.

Figure 2B:
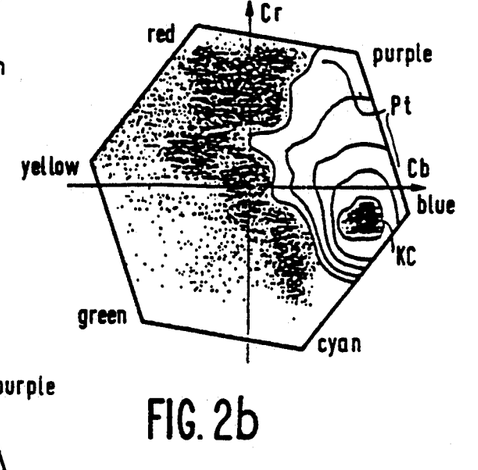

A condition for preventing these color fringes is a control signal which is formed by a complex gradient field as is shown in FIG. 2b. This takes all color locations of the foreground into account. Where the foreground color locations are relatively far remote from the key color KC, the proportional zone PZ commences correspondingly far from KC in order that these colors can be taken into account as an early stage during transformation of the color location. Such a region, when computed in an adjusting phase, can be stored as a table in known manner in a write/read memory which can be addressed by the chrominance signals Cb and Cr.

For an automatic computation it is necessary that foreground colors FG, key colors KC and transition colors in the proportional zone PZ are distinguishable for an automatic device. Only then can these color locations be given boundary lines. As the key colors and the foreground colors are not separately present in real pictures, which is shown as an example in FIG. 2c, various complex steps for deriving the control signal are necessary.

Figure 2C:
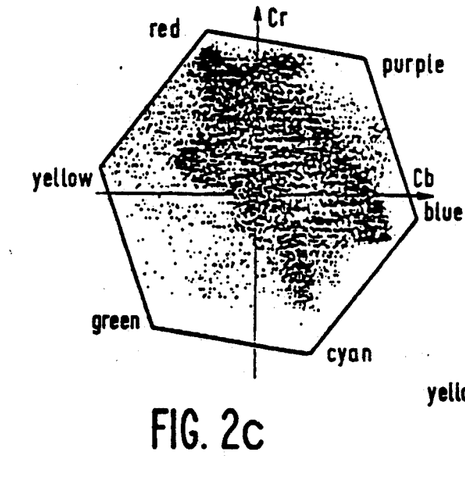
Figure 2D:
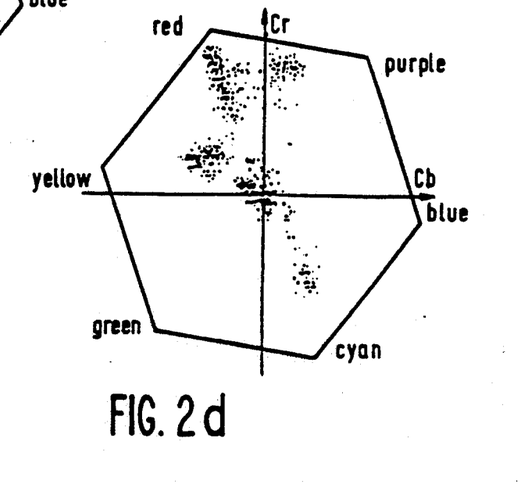

The method according to the invention uses a value, hereinafter referred to as chromatic homogeneity, as a feature of distinction between transition colors on the one hand and foreground colors and key colors on the other hand. Where the change of chrominance values between pixels adjacent to each other with respect to time and location exceeds a threshold value, it can be assumed that there are neither foreground colors nor key colors, but transition colors. The result of filtering the chrominance signals in accordance with FIG. 2c is shown in FIG. 2d. The considerably variable chrominance values are suppressed in this case. The stricter the requirements are imposed on the chromatic homogeneity, the stronger the centers of the foreground colors are filtered out.

Figure 5A:
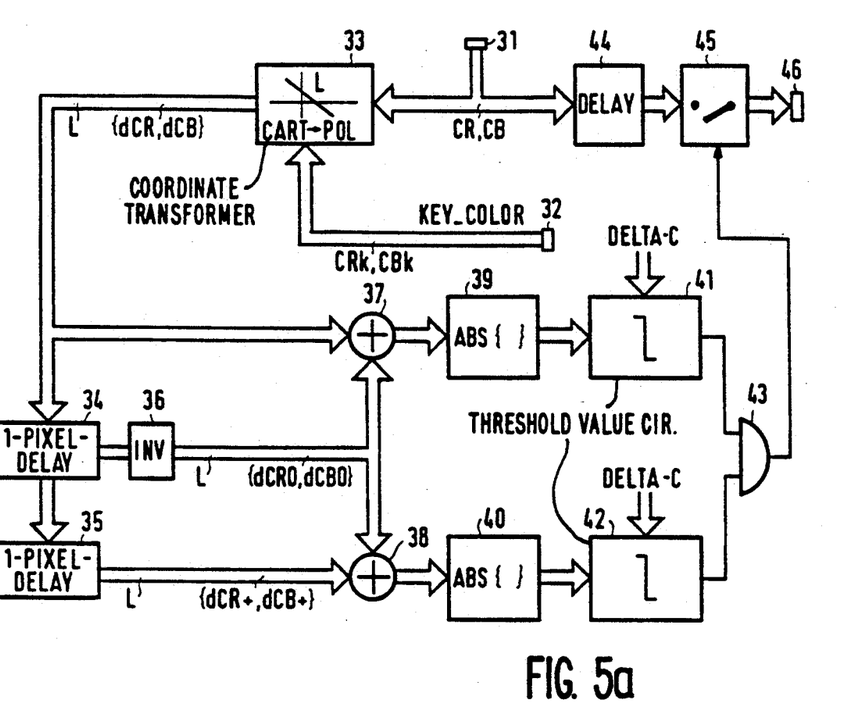
FIGS. 5a and 5b show block diagrams of parts of the arrangement of FIG. 1.
Figure 5B:
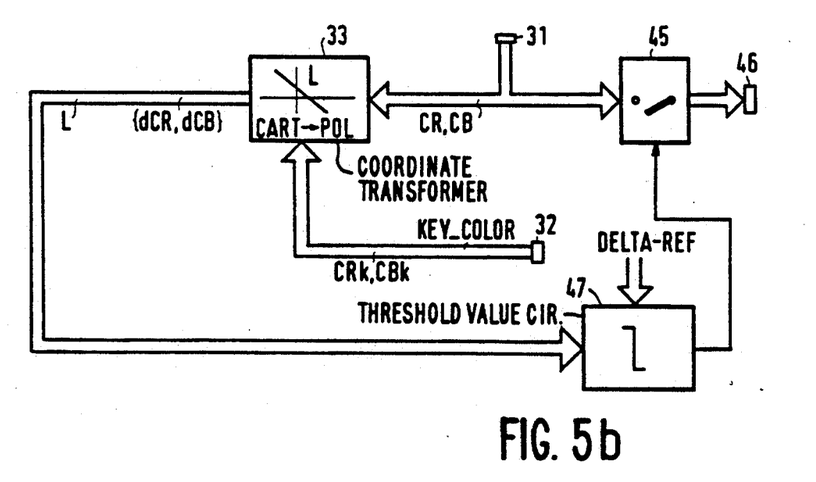

Essential functions in the automatic determination of the key region KC+PZ (FIG. 2b) are observed by test circuits as are shown, for example in FIGS. 5a and 5b.

The arrangement according to FIG. 5a is used as a test circuit 10 (FIG. 1) for filtering out those color locations which are distinguished by their chromatic homogeneity. To this end, an input 31 receives the chrominance signals Cr and Cb and a further input 32 receives the chrominance signals Crk and Cbk which represent the key color. In a known circuit 33, the representation of the color given by the chrominance signals Cr and Cb in cartesian coordinates is converted into a representation in polar coordinates. The key color is then used as a reference so that the length and the direction of the relevant adjacent color with respect to the key color are computed. A suitable circuit is the coordinate transformer marketed by the firm of TRW under type number TMC 2330.

However, only the length L{dCr,dCb} is used for further signal processing. It is delayed by one pixel period at 34 and at 35 so that the value L is simultaneously available for three adjacent pixels. At 36 the length of the central pixel is inverted and at 37 and 38 it is added to the non-inverted lengths of the adjacent pixels so that length differences between two adjacent pixels are present at the outputs of the adders 37, 38. Of these differences, the absolute values are formed in circuits 39, 40, which values are subsequently applied to threshold value circuits 41 and 42. In these circuits the absolute values are compared with a reference value DELTA-C.

The output signals of the threshold circuits 41, 42 are applied to an input of an AND circuit 43. The output signal of the AND circuit 43 assumes the logic level 1 when the color location distance to the key color is smaller than or equal to DELTA-C in three adjacent pixels. The signal controls a gate circuit 45 in such a way that chrominance values of sufficient homogeneity are passed on to the output 46, i.e. filtered out of the overall number of chrominance values. A delay circuit for compensating the delay of the circuits 33 to 43 is arranged between the input 31 and the gate circuit 45.

FIG. 5b shows the test circuit 11 (FIG. 1) with which those color locations are filtered out which are remote from the key color KC by less than a predetermined distance DELTA-REF. To this end the chrominance signals are applied to a coordinate transformer 33, likewise as in the arrangement according to FIG. 5a. The distance L{dCr,dCb} is passed via a threshold value circuit 47 and controls the gate circuit 45, at whose output 46 those color locations can be derived that are spaced apart from the key color by a distance which is smaller than DELTA-REF.

By continuous closing of the gate circuit 45, both test circuits 10, 11 (FIG. 1) can be arranged to transmit all color locations, which is required in individual steps of the method.

Figure 3A:
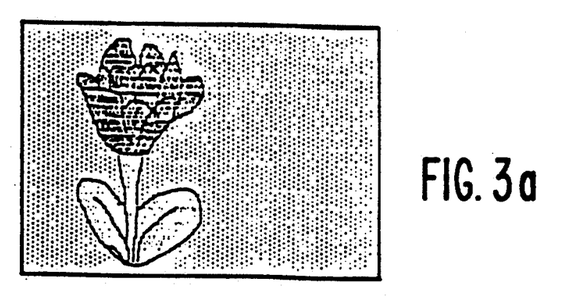
FIGS. 3a-3d show screen pictures.
Figure 3B:
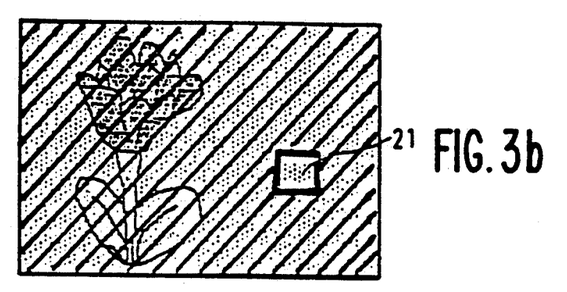
Figure 3C:
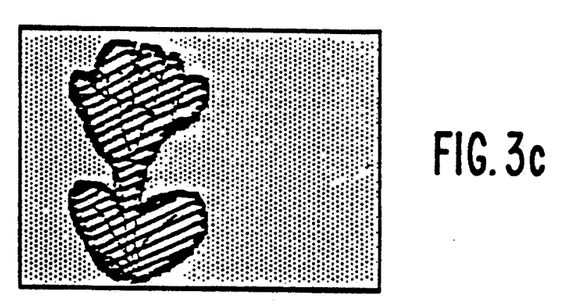
Figure 3D:
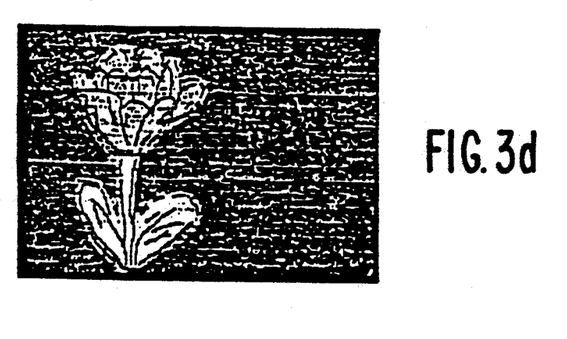
Figure 4A:
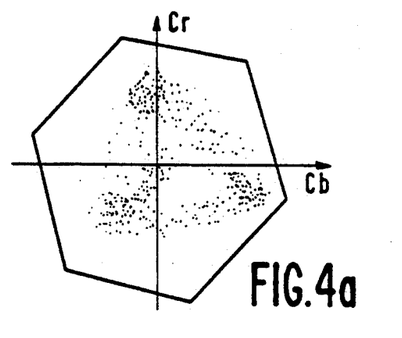
FIGS. 4a-4g show various color locations in the color plane to explain the method according to the invention.

The way in which the overall method proceeds will be described hereinafter with reference to the examples of the pictures in FIGS. 3a-3d and the representations in the color plane of FIGS. 4a-4g. The explanation is based on a picture (FIG. 3a) showing a flower in red and green hues in front of a blue background. This picture recording yields the foreground colors FG. The distribution of the color locations of this picture is shown in FIG. 4a. Concentrations of color locations are in the red, green and blue areas, the accumulation of color locations in the blue area being conditioned by the blue wall. Outside these accumulations and concentrations, the picture comprises several transition colors.

Figure 6:
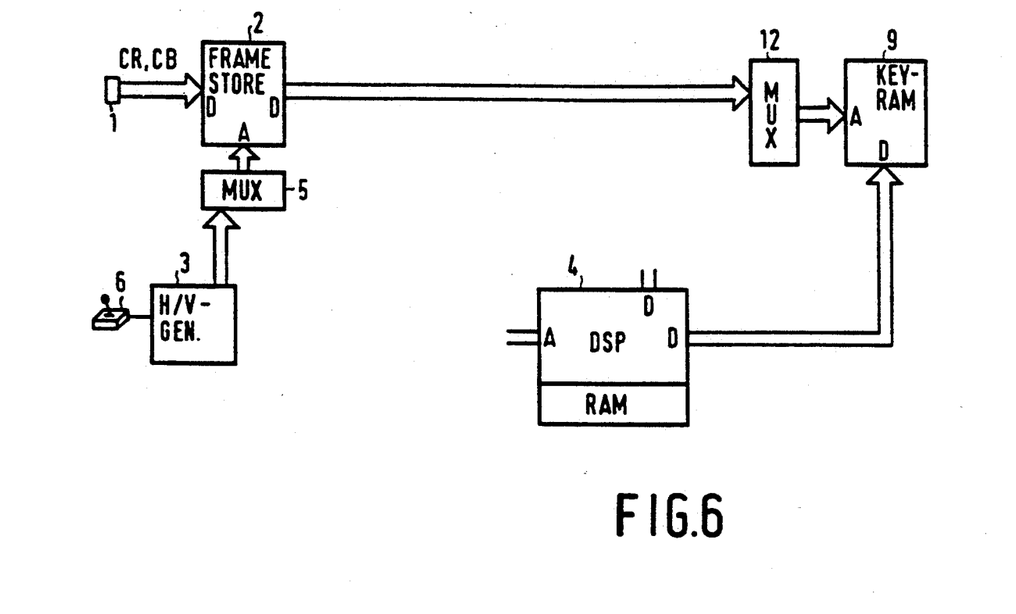
FIGS. 6 to 9 show parts of the arrangement of FIG. 1 representing the individual steps of an embodiment of the method according to the invention.

The parts of the arrangement effective for the first step of the method, and their interconnections are shown in FIG. 6. In the first step, a frame 21 (FIG. 3b) is directed onto a spot on the blue wall by means of the joystick 6 and the H/V generator 3 (FIG. 6), the color of this spot being defined as the key color. In conformity with the choice of the key color by means of the frame 21, the chrominance signals within the frame are read from the memory 2. Further signals are not used in this step of the method and are therefore shaded in FIG. 3b.

Figure 4B:
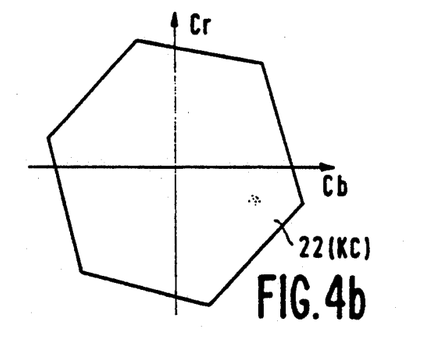

This choice yields color locations 22 which are located close together in the color plane and which essentially resemble the key color KC (FIG. 4b). The corresponding chrominance signals are applied via the multiplexer 12 to address inputs of the control signal memory 9. Values predetermined by the digital signal processor 4 are entered into the memory locations thus addressed, these values corresponding to the fading factor K = 1.

Figure 4C:
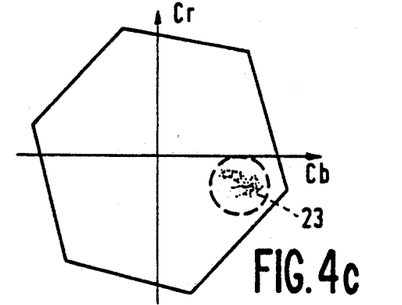

In a further step of the method, the digital signal processor 4 computes the center of the color locations stored so far, as well as the radius of the region 23, shown in a broken line in FIG. 4c. To this end, the address output of the digital signal processor 4 is connected to the address input of the control signal memory 9 via the multiplexer 12 in accordance with FIG. 7.

Figure 8:
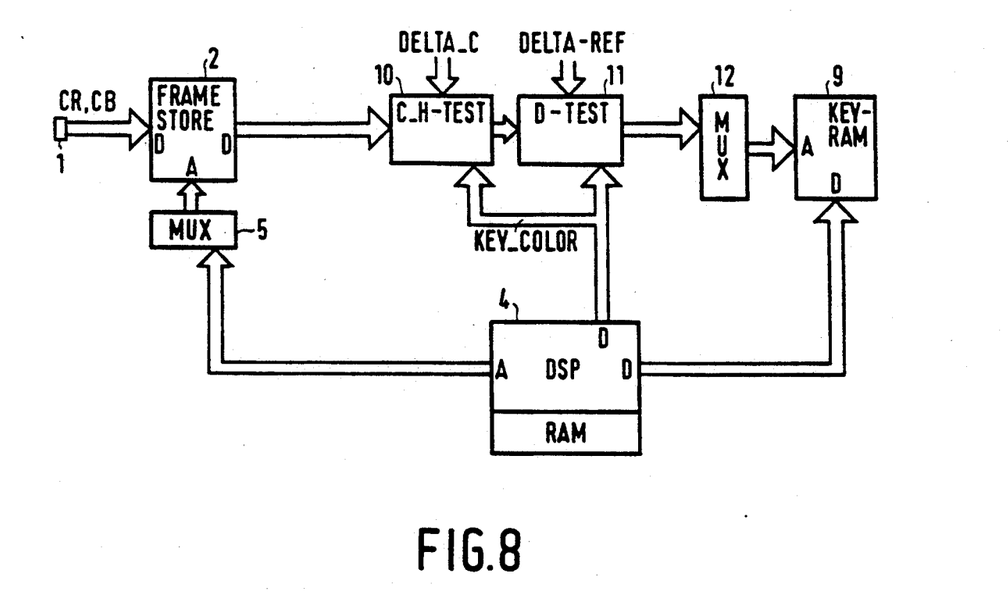

The color locations located in the region 23 are subsequently checked on whether they satisfy the homogeneity criterion. These are the color locations shown as dots in the example of FIG. 4c. For their computation, the arrangement according to FIG. 8 is operated by corresponding control of the multiplexers 5, 12.

Figure 4D:
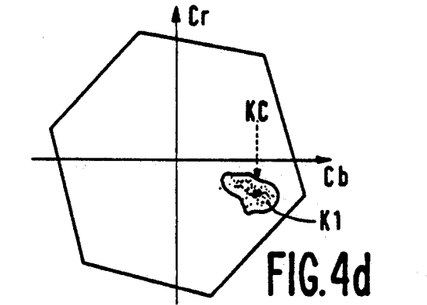

The arrangement will hereinafter be operated in accordance with FIG. 7 again, in which the digital signal processor 4 computes the boundaries of the closed key region K1 for which K=1 and which is shown in FIG. 4d. Moreover, a new center of the key color KC is computed. Substantially all colors of the blue wall are thereby covered, which is shown in FIG. 3c.

Figure 4E:
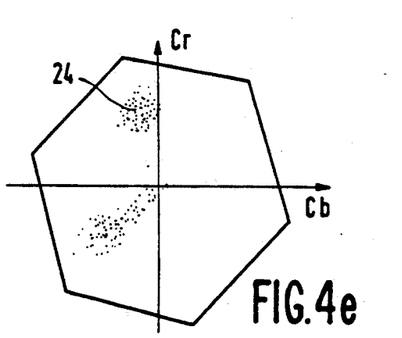
Figure 4F:
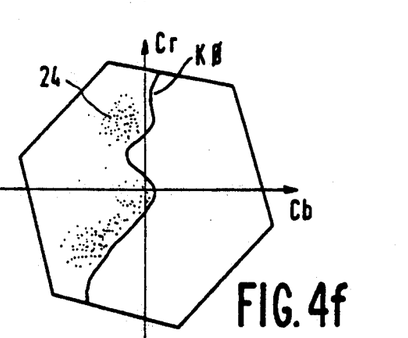
Figure 9:
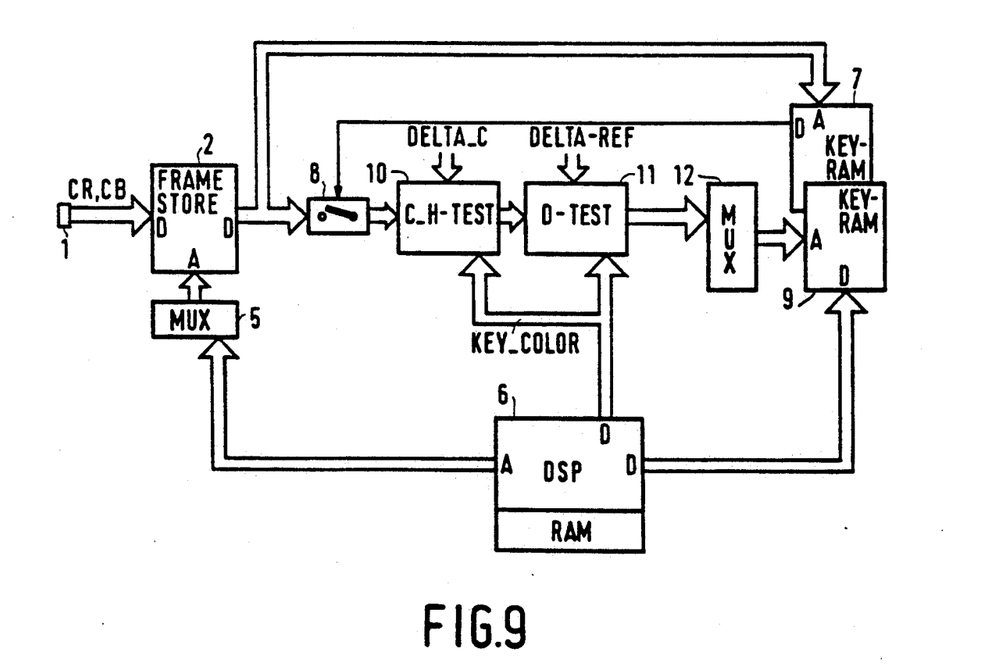

In a further step of the method, all foreground color locations complying with the homogeneity criterion and not belonging to the region K1 are filtered out. To this end, the arrangement according to FIG. 9 is operated. Since the homogeneity criterion is substantially only satisfied in the neighborhood of the centers of the foreground color locations, only the corresponding color locations are covered by this filtering, which is shown in FIG. 4e in the color plane and in FIG. 3d as a screen picture.

Figure 4G:
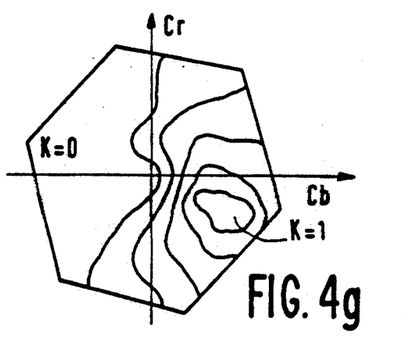
Figure 7:
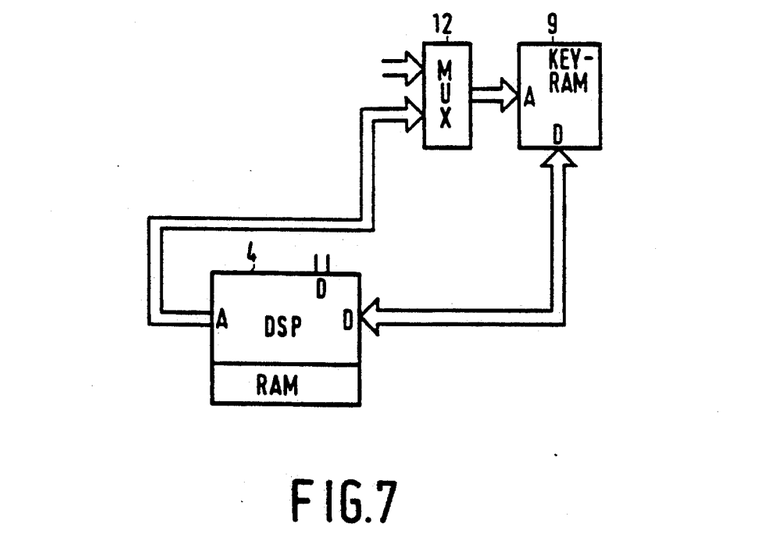

After the filtering of all chrominance signals stored in the memory 2 has been terminated, the arrangement is switched again in the configuration shown in FIG. 7. The digital signal processor then computes a boundary line K0 (FIG. 4f) bounding the foreground color locations 24. Subsequently, the fading control signal table is computed is such a way that there is radial interpolation between K0 and K1, which is illustrated in FIG. 4g by means of some lines. Finally, the digital signal processor fills up those color locations which are located outside K0, with K=0 and the color locations which are located within K1, with K=1.

For inserting a background signal instead of the blue wall, the chrominance signals of the foreground signal are applied to the address inputs of the control signal memory 9. The control signal is derived from the data outputs of this memory and applied in known manner to the control input of a fader.

I claim:

1. A method of deriving a control signal for inserting a background signal into parts of a foreground signal, these parts being fixed by a key color, in which the control signal assumes a first value when the foreground signal represents a color in the region of the key color and a second value when the foreground signal represents a different color, and in which the control signal has a transition range between the two values, characterized in that the method comprises the steps:

computing the distances between color locations of pixels of the foreground signal and a color location of the key color, for distinguishing color locations of pixels associated with foreground color or with the key color from color locations of pixels to be associated with the transition range;

associating those color locations of pixels whose distance to the key color's color location differs from a distance of a color location of one or a plurality of adjacent pixels to the key color's color location by more than a predetermined distance (not complying with a homogeneity criterion) with the transition range; and computing intermediate values of the control signal for the color locations of pixels associated with the transition range.

2. A method as claimed in claim 1, characterized in that the method comprises checking the homogeneity criterion both for determining the color locations of pixels of a foreground color within the region of the key color for which the control signal assumes the first value, and for determining the color locations of pixels of a foreground color different from the key color for which the control signal assumes the second value.

3. A method of deriving a control signal for inserting a background signal into parts of a foreground signal, these parts being fixed by a key color, in which the control signal assumes a first value when the foreground signal represents a color in the region of the key color and a second value when the foreground signal represents a different color, and in which the control signal has a transition range between the two values, characterized in that the method comprises the following steps:
- fixing a key color;
- determining all color locations of pixels which are located at a predetermined distance from the color location of a pixel of the key color and comply with the homogeneity criterion;
- defining a closed region in which the control signal assumes the first value with reference to the color locations of pixels determined in the preceding step;
- defining the center of the key region,
- determining all color locations of pixels which are not part of the key region and comply with the homogeneity criterion (herein as defines as foreground color locations);
- computing a boundary line between the foreground color locations and the transition range; and
- computing transition values between the key region and the boundary line by means of interpolation between the first and the second value in a radial direction with respect to the center.

4. An arrangement for deriving a control signal for inserting a background signal into parts of a foreground signal, these parts being fixed by a key color, in which the control signal assumes a first value when the foreground signal represents a color in the region of the key color and a second value when the foreground signal represents a different color, and in which the control signal has a transition range between the two values, characterized in that the arrangement comprises:
- a memory for storing chrominance signals of the foreground signal;
- a digital signal processor for selecting the chrominance signals of an adjustable frame, the chrominance signals selected by the digital signal processor being read from the memory;
- a first and a second test circuit to which the chrominance signals read from the memory are applied via a gate circuit;
- a multiplexer having a first input to which an output of said second test circuit is applied, and output from the digital signal processor being applied to a second input of the multiplexer;
- and a write/read memory having address inputs to which an output from the multiplexer is applied; the digital signal processor being connected to the first and second test circuits, to data inputs/outputs of the write/read memory and to the multiplexer, wherein the first test circuit computes the distances between color locations of pixels of the foreground signal and a color location of the key color, for distinguishing color locations of pixels associated with foreground colors or with the key color from color locations of pixels to be associated with the transition range, and wherein the second test circuit associates those color locations of pixels whose distance to the key color's color location differs from a distance of a color location of one or a plurality of adjacent pixels to the key color's color location by more than a predetermined distance (not complying with a homogeneity criterion) with the transition range, whereby said arrangement computes intermediate values of the control signal for the color locations in the transition range, the control signal being available at an output of the write/read memory.

* * * * *